Nov. 20, 1951 H. ROGERS ET AL 2,575,428
AUTOMATIC TWO-WAY PLOW
Filed March 12, 1945 3 Sheets-Sheet 2
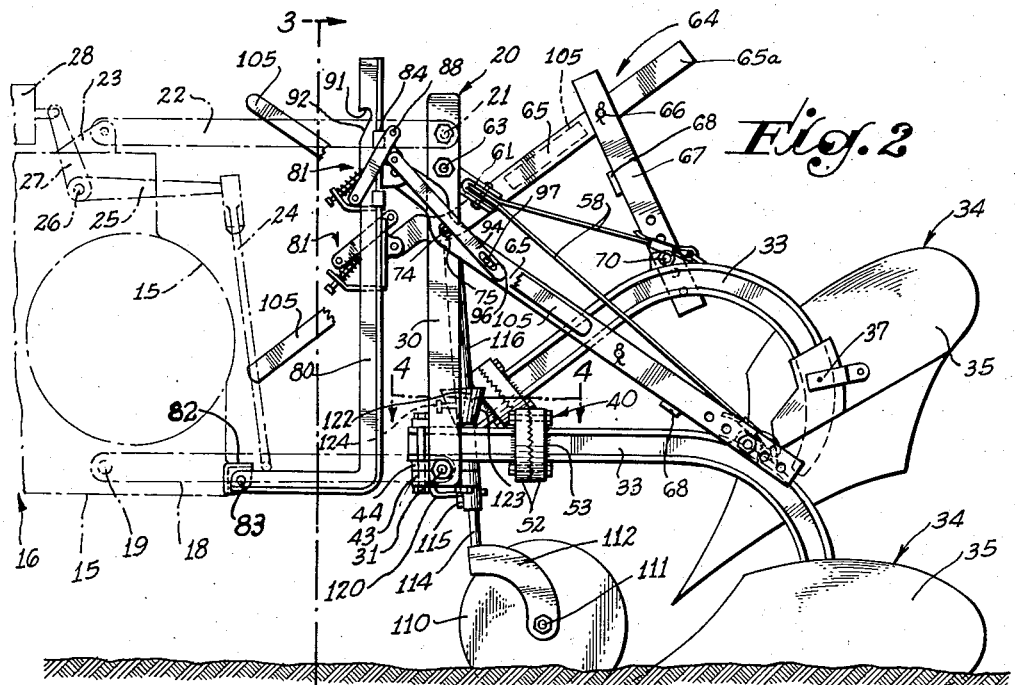
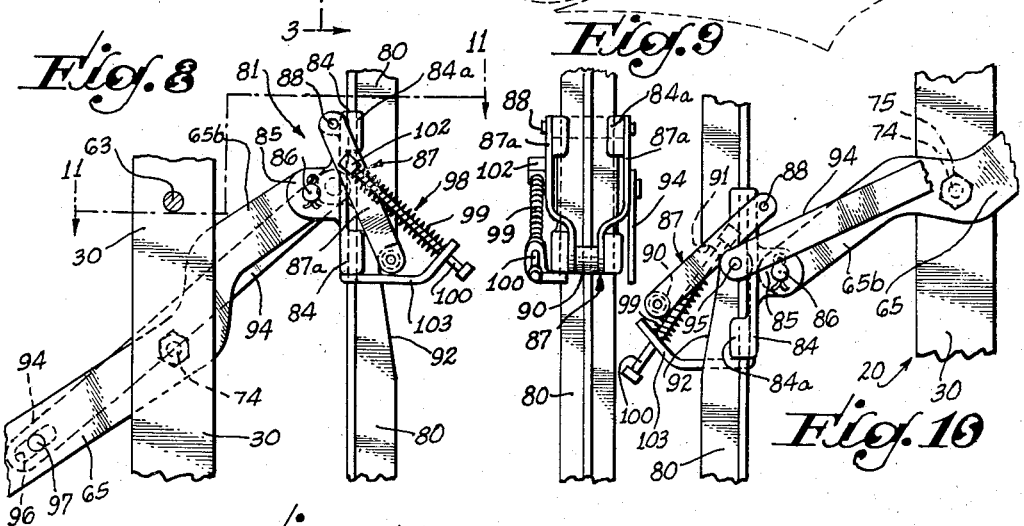
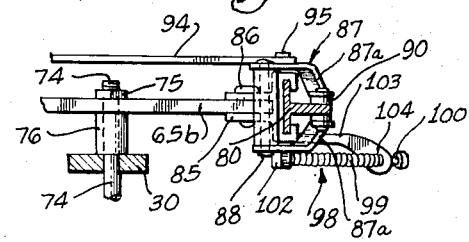
INVENTORS
HARRY ROGERS
WILLIAM FISK MELLEN
BY HARRIS, KIECH, FOSTER & HARRIS
FOR THE FIRM
ATTORNEYS

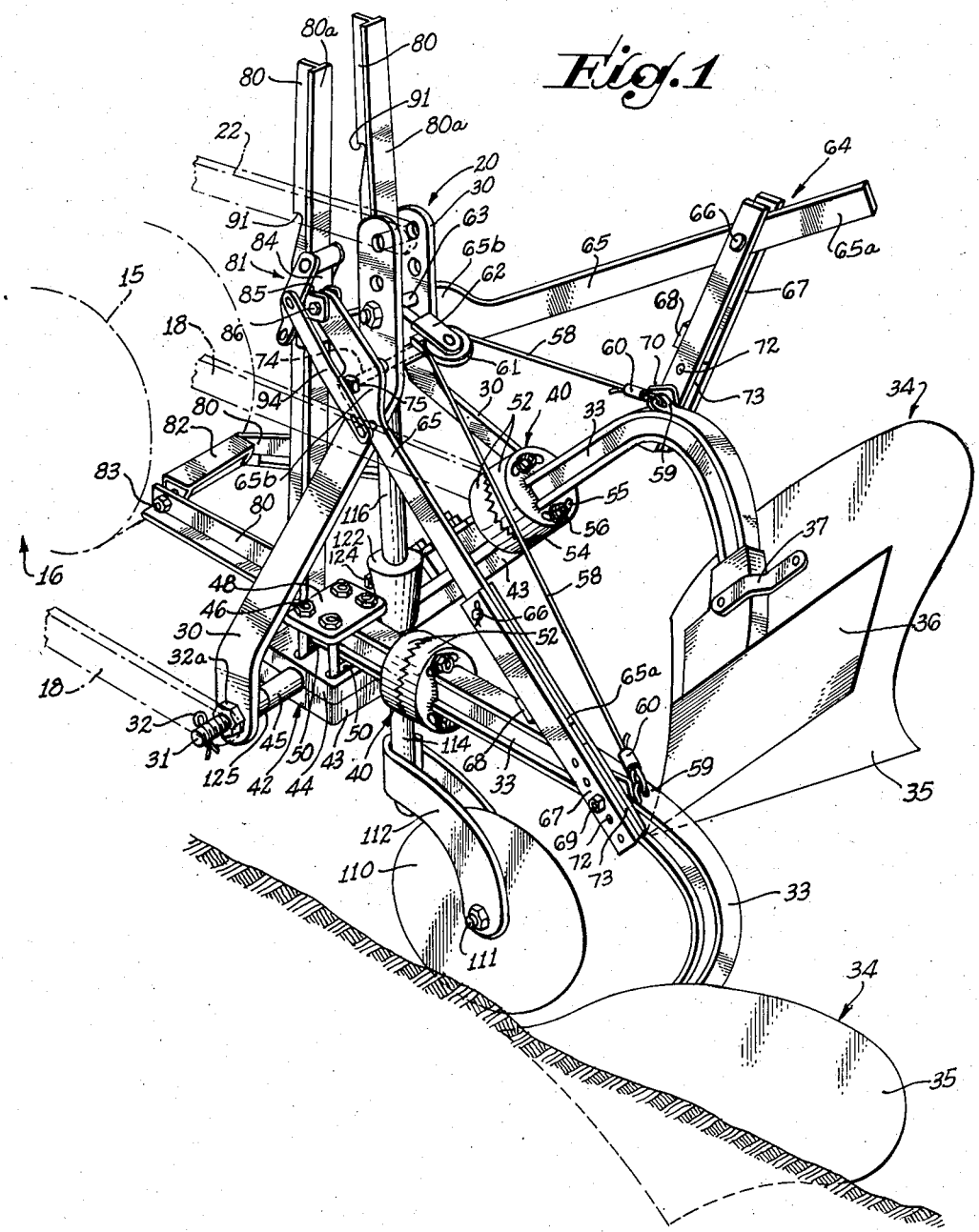

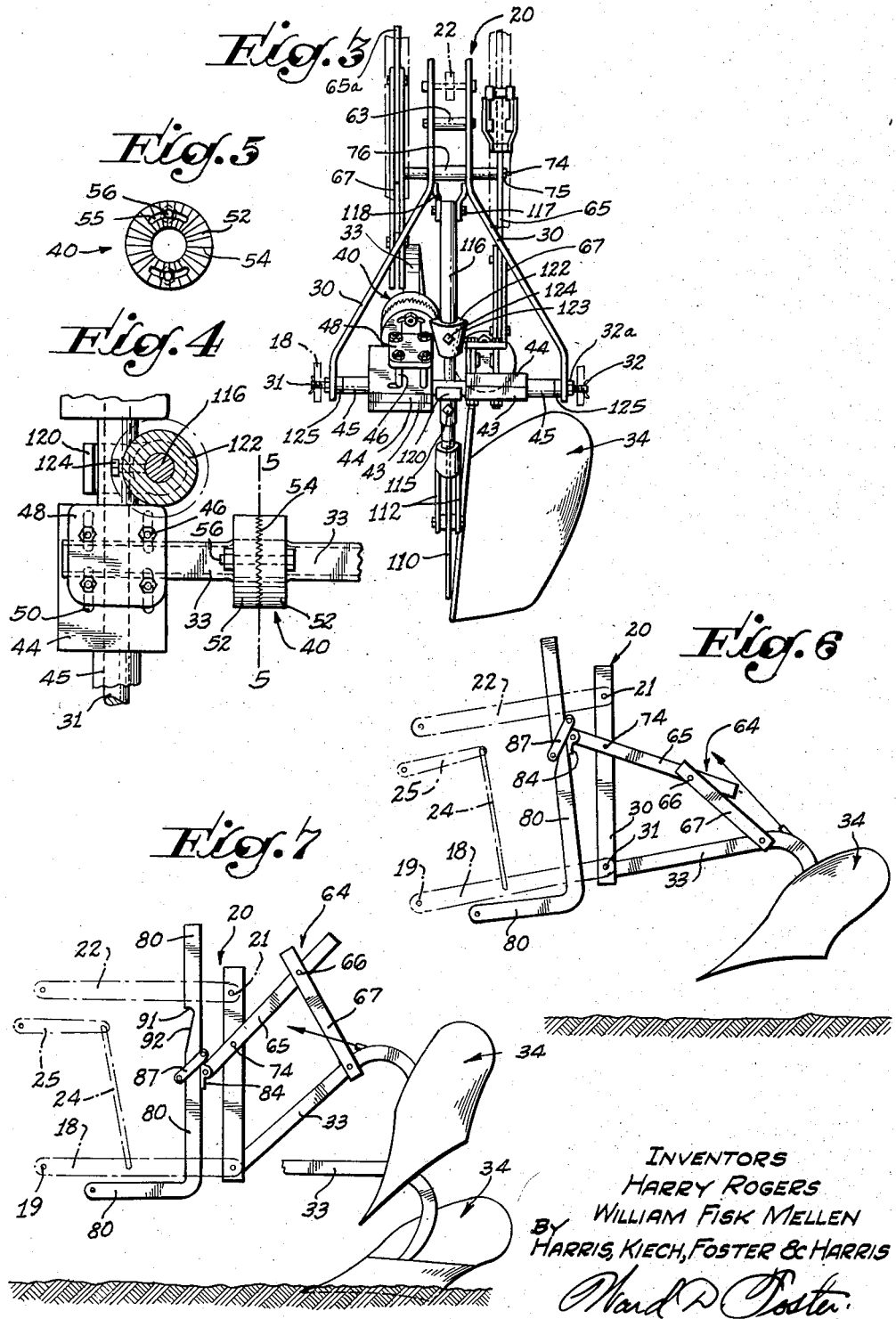

Patented Nov. 20, 1951

2,575,428

UNITED STATES PATENT OFFICE 2,575,428

AUTOMATIC TWO-WAY PLOW

Harry Rogers, Bakersfield, and William Fisk Mellen, Whittier, Calif.; said Mellen assignor to Alice Marian Mellen, Whittier, Calif.

Application March 12, 1945, Serial No. 582,314

22 Claims. (Cl. 97—29)

This invention relates to plow structures and more particularly to plows adapted to be drawn by powered vehicles such as tractors, and wherein the plows are mounted for movement to and from operative position.

In the more specific aspect, this invention relates to two-way plows in which pairs of plow bottoms, which are usually referred to herein simply as "plows," are mounted for selective movement to and from operative position in order that the vehicle drawing the plow structure may be turned directly around to plow a furrow adjacent to one just previously plowed, the respective positions of the plows being changed so that the newly plowed furrow may be thrown in the same direction as when the plowing structure was oppositely drawn.

A principal object of this invention is to provide a two-way plowing structure employing oppositely pitched plows by means of which the plow-controlling mechanisms may be tripped in order to reverse the plows automatically through actuation of a power operated control commonly found upon tractors employed for such purposes and being usually in the form of a hydraulic lift.

It is a further object of the invention to provide a two-way plow structure by which operation of the hydraulic control or other powered control to lift the plow structure will cause one plow to be automatically lifted and the other plow to be automatically lowered.

A still further object of the invention is to provide means for automatically reversing the relative positions of the plows in a two-way plowing structure such that, by one actuation of the power lift to lift the plowing structure bodily, the mechanism for raising one of the plows relative to the other will be actuated on the lifting stroke, such mechanism being tripped to inoperative position so that on the next actuation of the power lift mechanism to lift the other plow the lifting mechanism for the first mentioned plow which had been previously lifted will not function. It is also an object of the invention to provide means which will again trip mechanism which had previously been tripped into inoperative position, so that on a subsequent excursion of the mechanism lifted by the power lift, the lifting mechanism will be restored to operative condition.

It is a particular object of the invention to employ a supporting frame, commonly used in the farm implement industry and known as an "A-frame," as a support for the two-way plow structure of this invention, and to connect the automatic plow-shifting mechanism with the A-frame, the A-frame being actuated by the conventional or other hydraulic power lift, and to employ relatively stationary trip means or restraining means carried by the tractor or other draft implement to serve as an actuating or control mechanism for the plow-shifting mechanism as the A-frame is raised and lowered by the power lift.

A particular feature of the invention is found in the combination of a lever or lifting arm system which is connected with the A-frame structure upon which the two-way plows are mounted, this lifting arm system including joined levers, one arm of each of which constitutes a lifting arm, the outer end of which remote from the respective lever joint is equipped with means adapted to engage with a relatively stationary restraining means and adapted to be tripped at certain positions of the lifting arms to provide for or to avoid lifting engagement therewith. More broadly, the invention includes any mounting of the lifting arms with respect to the A-frame and the relatively stationary means such that relative movement between the A-frame and the relatively stationary means results in restraining one portion of the respective lifting arm while moving another portion thereof to accomplish elevation of the respective plow. In a preferred construction, the two plows are interconnected by means of a cable whereby they are counterbalanced so that one plow descends as the other plow is raised.

Other particular features of the invention relate to means for adjusting the plows at various angles as required, means for varying the suck of the plows when in operative position and with respect to varying operative conditions, and means for mounting and controlling a colter disk or similar earth-penetrating tool which serves to slice the earth in advance of the point of the operating plow.

Other objects and features of the invention will be apparent to those skilled in the art upon reference to the following specifications and to the accompanying drawings wherein certain embodiments of the invention are disclosed for the purpose of illustration.

In these drawings,

Fig. 1 is a perspective view of a two-way plow embodying the features of the present invention, its general relationship to a tractive vehicle employing power lift mechanism being indicated;

Fig. 2 is a side elevation corresponding in general with the perspective view of Fig. 1, the relation of the two-way plow construction and its automatic shifting mechanism to a hydraulic power lift on a tractor being shown in greater detail;

Fig. 3 is a front elevation, approximately as indicated by the line 3—3 of Fig. 2, the elevated plow being omitted for the purpose of greater clarity;

Fig. 4 is a horizontal detail taken approximately from the line 4—4 of Fig. 2;

Fig. 5 is a face elevation of one member of an adjustable joint viewed approximately from the line 5—5 of Fig. 4;

Figs. 6 and 7 are respectively diagrammatic elevations representing two successive stages in the raising of one plow and the lowering of another;

Fig. 8 is an enlarged side elevational detail showing the relation of the parts, including a tripping mechanism, at the commencement of a lifting operation where the parts are at a stage somewhat earlier than that indicated by Fig. 6;

Fig. 9 is a front elevational detail of the parts in the positions indicated in Fig. 8;

Fig. 10 is a side elevational detail, taken from the opposite side of that of Fig. 8, and indicating the operation of the trip mechanism to project the lifting mechanism out of lifting position; and Fig. 11 is a cross-sectional detail, taken approximately on the line 11—11 of Fig. 8.

In the drawings, the rear housing 15 of a tractor 16 is indicated in broken lines. To opposite sides of the housing 15 two lifting arms 18 are provided, their forward ends being pivoted at 19 upon the housing 15. The rearward ends of the arms 18 serve to support the lower end of an A-frame 20 whose upper end has connected thereto as by means of a bolt 21 a positioning arm 22, the forward end of which is connected with the tractor housing 15 through a part 23 which may be an automatic control conventionally employed on some tractors for adjusting the A-frame 20 or similar framework in accordance with the pull or thrust on the positioning arm 22. The lifting arms 18 are controlled by means of lifting links 24 whose lower ends are connected respectively to middle portions of the arms 18 and whose upper ends are connected to the outer ends of a forked bell crank 25 pivoted on the housing 15 as by means of a rock shaft 26, the upper arm 27 of the bell crank 25 being connected with a hydraulic lift mechanism 28 under the control of the operator of the tractor 16.

The A-frame 20 comprises two bent side members 30 whose lower portions diverge to assume positions respectively adjacent the rear ends of the lifting arms 18, the members 30 of the A-frame 20 being supported on the arms 18 through the medium of a transverse shaft 31 extending through the adjacent extremities of the members 30 and the arms 18, and being conveniently secured in any appropriate manner as through cotter keys 32 and nuts 32a.

The shaft 31 at the lower end of the A-frame 20 carries plow beams 33 in the form of I-beams whose lower ends are curved downward and support conventional plow bottoms 34 which are herein called "plows" and which include the usual mold boards 35 and landsides 36, the whole in each instance being secured to the I-beam 33 by appropriate attaching means 37.

The forward portion of each of the beams 33 is divided, the two parts being connected by adjusting joints 40. The forward extremity of each I-beam 33 is carried upon a mounting positioned upon the respective end of the shaft 31, each mounting comprising a lower retaining plate 42 and an upper bearing plate 44 clamped or welded upon a tube 45 through which the shaft 31 extends. The clamping of the plates 42 and 44 is accomplished through the medium of a plurality of bolts 46 which also bind upon the top of the respective beam 33 a tie plate 48 whereby to anchor the beam 33 and its plow 34 in adjusted position. Bodily adjustment laterally is accomplished through the medium of slots 50 (Figs. 1 and 4) in the plates 42 and 44. At the same time, the beams 33 may be offset laterally merely by a slight twist which will be permitted by the play provided for each beam 33 between the bolts 46. In order to change the cant of the plows 34, a rotary adjustment may be accomplished through the medium of the respective joints 40. Each joint 40 comprises two parts 52 welded at 53 to the respective portions of the beam 33, and adjustment is accomplished by means of serrations 54 with which the opposing faces of the joint parts 52 are provided. The joint parts 52 are also provided with radially opposed arcuate slots 55 in which bolts 56 are mounted and by which the parts are bound in adjusted position.

The rear portion of each of the I-beams 33 adjacent the top of the downwardly extending curve has one end of a cable 58 attached thereto through the medium of an eye 59 positioned on the upper edge of the beam, clamps 60 being employed to secure the cable ends in the eyes 59. The intermediate portion of the cable 58 passes through a pulley 61 which is mounted in any suitable retainer such as a clevis 62 carried by a cross bolt 63 extending through the upper ends of the members 30 of the A-frame 20.

Each of the I-beams 33 has connected thereto, at a position adjacent the respective eye 59, the lower end of a jointed lever 64 which serves both as a lifting means for the respective plow to raise it into elevated position and to brace it in lowered operative position. Each lever 64 comprises an elongated section in the form of a lifting lever arm 65 which is connected by a pivot 66 between adjacent ends of two spaced members forming a connecting link 67. Secured to the under edges of the members of each link 67 and spanning the space between them is a stop 68 adapted to be engaged by an adjacent extremity 65a of the respective lever arm 65 to retain the latter just past dead center when the respective lever 64 is in lowered or bracing position. The lowermost end of each link 67 is connected by means of a pivot bolt 69 to an ear 70 secured to the top of the respective I-beam 33 whereby the link 67 is pivoted upon the beam. For the purpose of adjusting the end of each link 67 with respect to its beam 33, whereby to vary the length of the lever 64 as a whole and thereby adjust the amount of suck of the plow when in operative position, a plurality of holes 72 is provided for selective reception of the respective bolt 69. In order to maintain the spacing of the members of each link 67, a spacer bar 73 is provided therebetween.

The opposite end of each lifting lever arm 65 is pivotally mounted upon the upper portion of the A-frame 20 by means of a cross pivot bolt 74 which passes through the corresponding portions of the frame members 30, the parts being properly retained by means of suitable nuts 75 and spacers 76 as may be required.

Thus, when a plow is in lowered position, as indicated in the various figures, the respective jointed lever 64 serves to brace that plow, and when a plow is in elevated position the respective jointed lever 64 is folded about its pivot 66, such a position being attained with any operation serving to raise the respective plow. Such a plow-lifting effect is attained by means of an influence which serves to swing the respective lifting lever arm 65 about the pivot provided by the pivot bolt 74, and in the present construction this is accomplished by relatively depressing the end of the respective lifting arm 65 which extends beyond the pivot bolt 74. The operation of the two lifting arms 65 to elevate their respective plows 34 is accomplished by means of corresponding trip mechanisms, which comprise trip arms 80, which act as restraining means at certain stages of actuation of the parts, and latch means constituting elevators generally indicated at 81. The trip arms 80, which are shown in the form of angular brackets, constitute part of a frame structure in connection with a transverse support 82 secured to the rear of the tractor housing 15 and to which the trip arms 80 are connected by means of pivots 83. Each trip arm 80 is in the form of a T-iron and each elevator 81 includes a slide 84 travelling upon the head 80a of the respective T-iron, each slide 84 being held around the respective head 80a by means of overhanging guide flanges 84a. The outside wall or back of each slide 84 is provided with ears 85 which carry a transverse pivoting bolt or pin 86 which engages in an aperture in the extremity of a corresponding end portion 65b of the respective lifting arm 65. On the upper end of each slide 84, there is mounted a latch 87 which comprises a pair of converging links 87a lying on opposite sides of the respective trip arm 80 and having their upper ends pivoted to the slide 84 by a pivot pin 88. Each latch 87 includes also a transverse detent 90 carried between the lower converging ends of the links 87a, as best seen in Figs. 9 and 11. These detents 90 are adapted to engage under a shoulder 91 formed by a notch cut in the forward edge of the main web of the T-iron constituting each of the trip arms 80, each notch providing a relatively inclined face 92 along which the respective detent 90 may travel under certain conditions.

The position of each slide 84 on its trip arm 80 is controlled in part by the respective shoulder 91 and in part by the movement of the adjacent end 65b of the respective lifting arm 65. In the form shown, each arm end 65b is offset upward above the center line of its lifting arm 65 for the purpose, when in some positions, of properly clearing the diverging portions of the particular A-frame members 30 illustrated, although this offset might be avoided where the A-frame is differently proportioned.

The movements of each slide 84 are in turn governed by the position of the respective latch 87, which is drawn into engaging position, as shown in Fig. 8, under certain conditions and, as shown in Fig. 10, is moved away from the respective trip arm 80 into disengaging position under other conditions. This shift of the latch 87 is accomplished in each instance by means of a shift bar 94 pivoted upon a projecting portion near the upper end of one of the latch links 87a by means of a pivot pin 95, the other end of each shift bar 94 being mounted through the medium of a slot 96 upon a stop stud 97 carried by the respective lifting arm 65, the slot 96 caring for lost motion, as will be hereinafter described. As the respective lifting arm 65 is moved from its position illustrated in Fig. 8 to its position as illustrated in Fig. 10 and back to the position of Fig. 8, the shift bar 94 causes the latch 87 to be moved to and from position to engage the shoulder 91, the last portion of each of these movements being accomplished through the medium of a snap action device 98 which also serves to retain the respective latch 87 in either of the indicated positions. The snap device 98 comprises a coil spring 99 mounted around a rod 100 which carries at its upper end a boss 102 that is pivoted upon the respective link 87a opposite from that to which the respective shift bar 94 is pivoted. The boss 102 provides a seat for one end of the spring 99, the other end of the spring 99 being seated upon the projecting extremity of a finger 103 which is provided at that end with an aperture 104 through which the rod 100 extends, the finger 103 being rigidly secured at its other end to the lower end of the respective slide 84. The operation of these parts will be later described in detail.

For the purpose of manual operation, each lifting arm 65 is provided with a laterally offset manipulating tongue 105 which projects sufficiently toward the operator's seat to be accessible for the purpose. To facilitate the showing of the other parts and avoid confusion, this tongue 105 is shown only in part and only on the lifting arms 65 of Fig. 2. The offset of each tongue 105 is sufficient to clear all operating parts, and its length is such only as to avoid contact with the tractor and other mechanisms.

To facilitate plowing operations, a cutter, which is in the form shown a colter disk 110, is positioned forward of the plows 34 and is adapted to be automatically adjusted from side to side so as to be aligned with the point of that plow 34 which is in lowered operative position. The colter disk 110 in the form shown is pivotally carried on an axle 111 supported in a fork 112 welded upon the lower end of a vertical post 114 which is secured as by means of a set screw 115 in the lower end of an upstanding hollow post 116 (Fig. 2) whose upper end is pivotally mounted on a pivot bolt 117 (Fig. 3) between two fingers 118 conveniently welded to adjacent portions of the A-frame members 30.

The lower portion of the post 116 at a position just below the transverse shaft 31 has secured thereto an angularly bent finger 120 which extends forward and whose extremity is bent upward along the forward side of the shaft 31 whereby to hold the post 116 against the rear of the shaft 31 and thereby establish the fore and aft position of the colter disk 110. For the purpose of laterally adjusting the disk 110, a cam block 122 having opposite sloping sides 123 is mounted on the post 116. In the form shown the block 122 is an inverted frusto-conical member axially apertured to receive the post 116 and adjustably mounted thereon as by a set screw 124. The sloping sides 123 are engaged by the adjacent edges of the opposing tie plates 48. Each tie plate 48, upon elevation of the respective beam 33 and plow 34, forces the cam block 122 against the opposite tie plate 48 as the latter is being lowered with its beam 33 and plow 34. As a result, the cam block 122, post 116, and colter disk 110 are shifted laterally whereby to align the disk 110 with the point of the respective plow 34.

The principal purpose of the adjustment permitted by the set screw 124 is to raise and lower the cam block 122 to permit variation of the space between the tie plates 48 and the beams 33 when it is desired to change the sizes of the plows 34. Such space variation is made possible by using tubular spacers 125 on the shaft 31 at the ends of the tubes 45, these spacers being positioned on the middle of the shaft 31 between the beams 33, or adjacent the A-frame members 30, as required for the purpose. The rearrangement is readily accomplished by removing the shaft 31.

The construction described is adapted to be used as a ditcher by lowering both plows 34 into operating position, each of the jointed levers 64 thus serving as a means to brace its respective plow. This lowering of both plows may be accomplished either by disconnecting one of the cable clamps 69 or by disconnecting the pulley 61 as by removing the cross bolt 63 from the A-frame members 30. Also, the shift bars 94 are disconnected and the latches 87 moved manually to their projected or inoperative position so that they will not engage the shoulders 91 as the A-frame 20 is raised. In this condition, both plows may be lifted from the soil by conventional operation of the A-frame 20 through the medium of the hydraulic lift 25, 28, without actuation of the lifting arms 65.

Operation

In preparing the two-way plow of this invention for operation, the bolts 46 passing through the tie plate 48 and the retaining and bearing plates 42 and 44 are loosened so that the respective plow beams 33 may be shifted laterally to provide for proper lateral adjustment of the respective plows 34, the bolts 46 being then tightened. Similarly, the bolts 56 in the joints 40 are loosened so that the joint parts 52 may be respectively rotated to attain a desired pitch of the respective plows 34. In order to vary the "suck," that is the depth of draft or cut, of the respective plows 34, the bolts 69 are adjusted in the holes 72 in the lower ends of the sections 67 of the jointed levers 64, the connecting cable 58 being correspondingly adjusted by means of one of the clamps 69.

Plowing will be commenced with one of the plows in elevated, inoperative position and the other in lowered, operative position, as illustrated in both Figs. 1 and 2. As the tractor 16 is drawn forward, the operating plow 34 throws a furrow in the corresponding direction. Having reached the edge of the field, the operating plow 34 is lifted from the soil by actuation of the hydraulic mechanism 28 under the control of the driver, the bell crank 25 working through the lifting links 24 serving to lift the A-frame 20 through the medium of the arms 18. The previously operating plow having been sufficiently lifted, the tractor is turned around to align the other plow in operative position, at which time the operator further actuates the hydraulic mechanism 28 to continue elevation of the A-frame 20.

During preliminary movement of the A-frame 20, the lifting arm 65 of the lowered plow remains in its original bracing position, the two plows 34 during that stage being bodily elevated without effecting operation of the respective elevator 81. During this portion of the movement of the parts, slide 84 travels upward along the head of the T-iron forming the respective trip arm 80.

However, when the A-frame 20 has been raised sufficiently for the operating plow 34 to clear the soil, which normally will occur when about three-fourths of the total movement of the A-frame 20 has been accomplished, the detent 90 of the respective latch 87 will fall into the notch providing the shoulder 91 in the respective trip arm 80, thereby checking further upward movement of the respective latch 87 and its slide 84. Continued elevation of the A-frame 20 causes depression of the end 65b of the corresponding lifting arm 65 causing the arm 65 to swing about its pivot bolt 74, thereby breaking the jointed lever 64 at its pivot 66 and causing it to pass through the position shown in Fig. 6 and gradually assume a position like that of Fig. 7. During the elevation of the slide 84 and its latch 87, the detent 90 will have been in engagement with the forward edge of the trip arm 80 by reason of having been previously drawn into that position under the influence of the respective shift arm 94 as by a previous operation of the mechanism, or by manual manipulation.

When elevation of the frame members 30 of the A-frame 20, acting through the pivot bolt 74, has caused the respective lifting arm 65 to assume the position shown in Fig. 10, which is the same relative position of the lifting arm 65 and of its link section 67 as shown in Figs. 2 and 7, the shift bar 94 will have assumed the position with respect to the pivot pin 86 by which the slide 84 is attached to the end 65b of the lifting arm 65 that is illustrated in Fig. 10. Inasmuch as the attachment of the shift bar 94 to the latch 87 at the pivot pin 95 is relatively close to the pivot 88 which mounts the latch 87 upon the slide 84 in each instance, the lower end of the latch 87 carrying the detent 90 is pushed past its dead center position by the shift bar 94. Having passed the dead center position, the spring 103 then acts to push the link 87 to the limit of this disengaging movement, and the slot 96 in that end of the shift bar 94 which engages the stop stud 97 cares for the resultant lost motion of the shift bar 94. As long as the lifting arm 65 maintains the elevated position illustrated in Fig. 10, the latch 87 remains disengaged. Thus, when the A-frame 20 is lowered after having so elevated a plow 34 and its lifting arm 65, the respective detent 90 slides downward on its trip arm 80 with its slide 84 but out of engagement with the respective trip arm 80, as is illustrated in Fig. 7, and on a subsequent elevation of the A-frame 20 the detent 90 of the respective latch 87 will remain out of engagement until the respective lifting arm 65 has been moved from its elevated position of Figs. 2, 6 and 10 to its lowered position, as described below:

As the A-frame 20 is elevated by the arms 18 upon their pivots 19, the resultant swinging movement tends to move the frame 20 toward the trip arms 80. Due to the connection of the arm ends 65b to the slides 84, this movement is imparted to the arms 80 which move upon their pivots 83 in compensation, as indicated in Fig. 6.

When one plow 34 is raised, the opposite plow 34, being connected by the cable 58 in counterbalanced relation, descends to operative position, at which time its jointed lever 64 is straightened into bracing position. Upon the descent of a plow 34 from the elevated position to the lowered operative position, the end of the respective shift bar 94 in engagement with its stop stud 97 on the respective lifting arm 65 is gradually moved with respect to the pivot pin 86 which connects the end 65b of the lifting arm 65 with the respective slide 84 until the various pivot points are substantially in a straight line, thereby representing the greatest distance between the stop stud 97 and the pivot pin 95 on the latch 87. At approximately this position, which is generally illustrated in Fig. 8, the latch 87 is pulled by the shift bar 94 from its inoperative position shown in Figs. 7 and 10 toward the operative position indicated in Fig. 8. When the lower end of the latch 87 carrying the detent 90 passes the dead center position with respect to the spring 99 and its rod 100, the snap action of the spring 99 completes the movement into operative position shown in Fig. 8 and serves to retain the latch 87 in such operative position.

After the latch 87 has been moved into the operative position of Fig. 8 under the draft influence of the shift bar 94 and the snap action of the spring 99, the slide 84 and the detent 90 continue their downward movement along the respective trip arm 80 as the downward movement of the A-frame 20 continues. The slide 84 and the latch 87, together with its detent 90, are thus in operative position ready to lift the lowered plow 34 and change the relation of the plows upon the next upward excursion of the A-frame 20 under the influence of the hydraulic lift mechanism 25, 28.

By means of the construction here disclosed, it is possible to plow by throwing adjacent furrows in the same direction upon successive trips across a field, the changing of the position of the two plows being accomplished automatically in conjunction with the normal operation of the hydraulic mechanism 28 by which the A-frame 20 is raised and lowered when lifting the plows out of the soil.

As each plow 34 is raised and the other plow 34 is simultaneously lowered by reason of the counterbalance connection through the cable 58, one edge of the tie plate 48 on the plow beam 33 being elevated engages the adjacent sloping side 123 of the cam block 122, thereby forcing the block 122, the post 116, and the colter disk 110 toward the other plow beam 33 whereby to align the colter disk 110 with the other plow 34. This shift of the block 122 and the post 116 is permitted by reason of the fact that the other plow beam 33 and its tie plate 48 are descending along the sloping side 123 of the opposite side of the block 122. Inasmuch as the block 122 is adjustably mounted on the post 116 through the medium of the set screw 124, it is possible to vary the amount of shift to accommodate plows 34 of different sizes. This shift is permitted by removing the transverse supporting shaft 31 and interchanging the small spacers 125 accordingly.

Inasmuch as many modifications of the generic invention herein described and illustrated will become apparent to those skilled in the art, it is intended to cover all such variations as fall within the scope of the appended claims.

We claim as our invention:

1. A combination comprising: frame means; a pair of oppositely pitched plows movably carried by said frame means and adapted to be selectively lowered and raised to and from plowing position; lifting means connected with said plows to elevate the latter; trip means relatively movable with respect to said lifting means; and operative connections between said lifting means and both said frame means and said relatively movable trip means, one of said connections being bodily slidable along said trip means and adapted to engage said trip means upon relative movement whereby to actuate said lifting means to raise a plow.

2. A combination as in claim 1 wherein said lifting means comprise lever means fulcrumed upon said frame means, said frame means normally assuming an upright position, and said trip means being in the form of upstanding means in approximate parallelism with said frame means.

3. A combination as in claim 1 including shift means for shift of said one connection to and from operative position along said trip means as said lifting means changes position.

4. A combination as in claim 1 including power means to produce relative movement between said relatively movable trip means and said frame means and connected to actuate one of such means.

5. In combination: a frame structure; a pair of selectively movable soil working tools movably carried by said frame structure and adapted to be selectively lowered and raised to and from soil-working positions; a pair of lifting means respectively connected with said tools for selectively elevating the latter; a structure relatively movable with respect to said lifting means; and individual operative connections between each of said lifting means and both said frame structure and said relatively movable structure, the individual connection for each lifting means being adapted to engage and actuate the respective lifting means upon relative movement of said structures whereby to raise the respective plow.

6. A combination according to claim 5 wherein said relatively movable structure comprises a pair of upstanding trip means, and said individual connection for each lifting means is movable along the respective trip means to a trip position thereon for consequent actuation of the respective lifting means.

7. A combination as in claim 5 wherein shift means is included for each lifting means to shift the respective individual connection to and from engaging position as the respective lifting means changes position.

8. A combination as in claim 5 wherein said tools are interconnected whereby one tool is lowered as the other is raised.

9. A combination comprising: a frame structure; a trip structure with respect to which said frame structure is movable; a plurality of plows swingingly carried upon said frame structure and adapted to be lowered and raised to and from plowing position; a plurality of lifting means respectively connected with said plows for selectively elevating said plows, said lifting means individually having operative connections with both said frame structure and said trip structure; means for moving one of said structures with respect to the other for elevating said plows; and a plurality of movable elevator means individually connected with said lifting means and with one of said structures, said elevator means being respectively adapted for relative movement with respect to said trip structure and to and from operative position for actuating said lifting means.

10. A combination comprising: a frame structure; means for moving said structure vertically; a pair of substantially vertical trip arms associated with said frame structure; a pair of oppositely pitched plows swingingly carried upon said frame structure and adapted to be lowered and raised with respect to said frame structure to and from plowing position and adapted to be lowered and raised bodily with said frame structure; a pair of lifting means respectively connected with said plows for selectively elevating said plows with respect to said frame structure, each of said lifting means having operative connections with said frame structure and one of said trip arms; and movable elevator means connected with each of said lifting means and arranged for operative engagement by one of said trip arms, said elevator means being respectively adapted for relative movement to and from operating position for actuating said respective lifting means.

11. A combination according to claim 10 including means for shifting the respective elevator means to and from said operating position as said lifting means are respectively raised and lowered whereby said lifting means may be successively actuated.

12. In combination in a two-way plow structure: a frame; a pair of oppositely pitched plows movably carried by said frame and adapted to be selectively lowered and raised to and from operative positions; means to move said frame vertically; lifting means for each of said plows supported on said frame and respectively connected with said plows; trip means with respect to which said frame is movable and associated with each of said lifting means and adapted to actuate said lifting means to raise and lower the respective plows selectively, whereby said vertical movement of said frame actuates the respective lifting means through engagement with its trip means; and means connected with said lifting means and relatively movable with respect to said trip means and adapted for automatic engagement with said trip means to cause the latter to actuate the respective lifting means when the respective plow is in a lowered position.

13. A combination according to claim 12 including means on said relatively movable means whereby the latter is slidably guided on said trip means.

14. A combination according to claim 10 including means on said movable elevator means whereby the latter are slidably guided on the respective trip arms.

15. In combination: a frame structure; a pair of oppositely pitched plows pivotally carried upon said frame structure; means interconnecting said plows whereby each plow is adapted to be lowered when the other is raised; lifting devices carried on said frame structure and respectively connected with said plows to raise and lower said plows with respect to said frame structure; means to raise and lower said frame structure and said plows bodily in a substantially vertical path; a trip mechanism for each of said lifting devices, each trip mechanism being adapted to trip its respective lifting device to raise a lowered plow with respect to said frame structure upon vertical movement of said structure; and actuating means for each trip mechanism rendering the respective trip mechanism inoperative when the respective plow is in elevated position and rendering said respective trip mechanism operative when the respective plow is lowered, said actuating means including an elevator, a shift bar connected with and actuated by the respective lifting device for moving said elevator to and from tripping position, and snap action means connected with said elevator for maintaining said elevator in either tripping position or inoperative position.

16. In combination in a plow structure: two oppositely pitched plows; a supporting framework; plow beams pivotally mounted upon said framework and carrying said plows for selective raising and lowering of said plows; means interconnecting said plows whereby one is raised as the other is lowered; an auxiliary soil-penetrating tool disposed in advance of said plows and adapted to be shifted into selective alignment with said plows as said plows are respectively lowered; shifting means carried by said tool; cooperating shifting means respectively carried by said plow beams whereby said tool will be automatically shifted as said beams are respectively raised and lowered, certain of said shifting means being adjustable whereby to vary the amount of shift of said tool; and a vertical post on the lower end of which said adjustable shifting means is mounted, said adjustable means being a frusto-conical cam block through which said post extends and on which it is slidable.

17. In combination in a two-way plow: a frame; oppositely pitched plow means movably mounted on said frame and interconnected whereby one plow means is simultaneously lowered as the other plow means is raised; a pair of lifting arm members respectively connected with said plow means and pivoted upon said frame to raise said plow means selectively upon said frame; means to lift said frame and plow means bodily; a pair of trip members having means for mounting them on a tractive vehicle against substantial movement in the direction of lift of said frame and adapted to engage and actuate said lifting arm members respectively upon lift of said frame; latch means carried by each of the members of one of said pairs of members; and cooperating engaging means carried by each of the members of the other of said pairs of members to cooperate respectively with said latch means for lifting engagement to effect actuation of said lifting arm members, said latch means being movable between engaging and non-engaging positions with respect to said engaging means as said lifting arm members move between different angular relationships with respect to said trip members.

18. A combination as in claim 17 including tensioning means connected to the respective latch means to hold such latch means selectively in each of said engaging and non-engaging positions.

19. In combination in a two-way plow: a frame adapted to be lifted bodily; oppositely pitched plow means movably mounted on said frame to be lifted therewith and interconnected whereby one plow means is lowered simultaneously with the raising of the other plow means; lifting arm members respectively connected with said plow means and pivoted upon said frame to raise said plow means selectively upon said frame; trip members having means for mounting them on a tractive vehicle against substantial movement in the direction of lift of said frame; shiftable engaging means carried by each of said lifting arm members; and cooperating engaging means carried by each of said trip members to cooperate respectively with said shiftable engaging means for lifting engagement therewith to effect actuation of said lifting arm members, said shiftable engaging means being movable between engaging and non-engaging positions with respect to said cooperating engaging means as said lifting arm members move between different angular relationships with respect to said trip members.

20. A combination as in claim 19 including tensioning means connected to each of said shiftable engaging means to hold such shiftable engaging means selectively in each of said engaging and non-engaging positions.

21. In combination in a double plow structure: a pair of relatively movable frame assemblies, one of which has vertically extending members; a pair of plows mounted upon one of said assemblies for vertical movement; lifting means connected with each of said plows for lowering and raising said plows; a pair of sliding elevator means carried by the other of said assemblies and slidably movable vertically along said vertical members of said one of said assemblies and respectively connected with each of said lifting means; and trip means carried by said vertical members of said one of said assemblies to engage and actuate said elevator means, said lifting means being carried by one of said assemblies.

22. In combination: a frame structure; a pair of plows pivotally carried upon said frame structure, each plow being adapted to be lowered when the other is raised; lifting devices carried on said frame structure and respectively connected with said plows to raise and lower the latter upon said frame structure; means to raise and lower said frame structure and said plows bodily vertically; a trip mechanism for each of said devices, each trip mechanism being adapted to trip the respective lifting device to raise a lowered plow with respect to said frame structure upon vertical movement of said structure, said plows being interconnected to lower one plow as the other is raised; means for each trip mechanism to render the respective trip mechanism operative when the respective plow is lowered; and means to render each trip member inoperative when the respective plow has been elevated.

HARRY ROGERS.
WILLIAM FISK MELLEN.

REFERENCES CITED

The following references are of record in the file of this patent:

UNITED STATES PATENTS

| Number | Name | Date |
|---|---|---|
| 316,846 | Snyder | Apr. 28, 1885 |
| 536,574 | Lindestrom | Mar. 26, 1895 |
| 631,152 | Carroll | Aug. 15, 1899 |
| 710,395 | Ingersoll | Sept. 30, 1902 |
| 1,021,117 | Van Egeren | Mar. 26, 1912 |
| 1,078,846 | Gosnay | Nov. 18, 1913 |
| 1,302,339 | Esping | Apr. 29, 1919 |
| 1,381,662 | Reynolds | June 14, 1921 |
| 1,600,318 | Chisholm et al. | Sept. 21, 1926 |
| 1,733,914 | Shiller | Oct. 29, 1929 |
| 1,768,019 | Abeling et al. | June 24, 1930 |
| 1,800,284 | Delaye | Apr. 14, 1931 |
| 2,187,380 | Kaltoft | Jan. 16, 1940 |
| 2,244,774 | Hewitt | June 10, 1941 |
| 2,358,964 | Noffsinger | Sept. 26, 1944 |
| 2,364,367 | Janke | Dec. 5, 1944 |
| 2,371,924 | Scarlett | Mar. 20, 1945 |
| 2,401,837 | Mellen et al. | June 11, 1946 |
| 2,424,192 | Rogers et al. | July 15, 1947 |
| 2,437,879 | Ferguson | Mar. 16, 1948 |

FOREIGN PATENTS

| Number | Country | Date |
|---|---|---|
| 691,630 | France | July 15, 1930 |
| 14,159 | Great Britain | Oct. 25, 1884 |
| 544,041 | Great Britain | Mar. 25, 1942 |
| 120,185 | Switzerland | May 2, 1927 |